(12) United States Patent
Garcia et al.

(10) Patent No.: US 6,645,626 B2
(45) Date of Patent: Nov. 11, 2003

(54) SUPERPARAMAGNETIC NANOSTRUCTURED MATERIALS

(75) Inventors: Carlos Garcia, Ithaca, NY (US); Ulrich B. Wiesner, Ithaca, NY (US)

(73) Assignee: Cornell Research Foundation, Inc., Ithaca, NY (US)

(*) Notice: Subject to any disclaimer, the term of this patent is extended or adjusted under 35 U.S.C. 154(b) by 0 days.

(21) Appl. No.: 10/120,779

(22) Filed: Apr. 12, 2002

(65) Prior Publication Data

US 2002/0164481 A1 Nov. 7, 2002

Related U.S. Application Data

(60) Provisional application No. 60/283,354, filed on Apr. 13, 2001.

(51) Int. Cl.[7] .................................................. B32B 5/16
(52) U.S. Cl. ..................... 428/402; 428/403; 428/404; 428/405; 428/407; 75/343; 516/95
(58) Field of Search ................................. 428/402, 403, 428/404, 405, 407; 75/349; 516/95

(56) References Cited

U.S. PATENT DOCUMENTS

| | | | | |
|---|---|---|---|---|
| 5,952,040 A | * | 9/1999 | Yadav et al. ............. | 427/126.3 |
| 6,262,129 B1 | * | 7/2001 | Murray et al. ............ | 516/33 |
| 6,548,264 B1 | * | 4/2003 | Tan et al. ................. | 435/21 |

FOREIGN PATENT DOCUMENTS

| WO | WO 99/12994 | | 3/1999 |
|---|---|---|---|
| WO | 99/12994 | * | 3/1999 |

OTHER PUBLICATIONS

Templin, Markus, "Organically Modified Aluminosilicate Mesostructures from Block Copolymer Phases," Science, vol. 278, p. 1795–1798, (Dec. 5, 1997).

Ulrich, Ralph, "Nano–objects with Controlled Shape, Size, and Composition from Block Copolymer Mesophases," Advanced Materials, Wiley–VCH (Germany), vol. 11 (No. 2), pp. 141–146, (1999).

Finnefrock, Adam C., "Metal Oxide Containing Mesoporous Silica with Bicontinuous "Plumber's Nightmare" Morphology from a Block Copolymer—Hybrid Mesophase," Angew. Chem. Int. Ed., Wiley–VCH (Germany), vol. 40 (No. 7), pp. 1207–1211, (2001).

* cited by examiner

Primary Examiner—Leszek Kiliman
(74) Attorney, Agent, or Firm—Jones, Tullar & Cooper, P.C.

(57) ABSTRACT

Amphiphilic block copolymers are used as structure-directing agents for the production of superparamagnetic nanostructured material. A block copolymer solution containing an amphiphilic block copolymer is formed. A sol-gel precursor is formed by hydrolyzing and condensing a silicate precursor solution. An iron precursor is added to either the block copolymer solution or the sol-gel precursor. The sol-gel precursor is mixed with the block copolymer solution to form a hybrid inorganic nanostructured material. Solvent is then removed resulting in the formation of individual nanostructured material which is calcinated to form the superparamagnetic nanostructured material. The resulting superparamagnetic nanostructured material may be in the shape of a sphere, a cylinder, lamellae, or a mesoporous structure.

43 Claims, 2 Drawing Sheets

SUPERPARAMAGNETIC NANOSTRUCTURED MATERIALS

CROSS REFERENCE TO RELATED APPLICATION

This application claims the benefit, under 35 U.S.C. 119(e), of U.S. Provisional Application No. 60/283,354 filed Apr. 13, 2001, the contents of which are incorporated herein by reference.

BACKGROUND OF THE INVENTION

1. Field of the Invention

The invention relates generally to superparamagnetic nanostructured materials and a method for making the same.

2. Background Information

Engineering synthetic materials towards the molecular architecture of biological molecules is a powerful concept. These synthetic materials may be efficiently integrated with biological molecules for further detection or targeting of biological tissues. Synthetic material that is fabricated near an atomic length scale ~10 nm is particularly challenging since this is a lower limit on which important biological processes and mechanisms occur in nature. Of particular interest is the synthesis of magnetic particles approaching the 5 nm length scale. Magnetic particles can be used as markers for the detection of biological molecules or in a drug delivery system to target infected biological tissues. The detection and targeting may be monitored or controlled using the magnetic properties of the particles. In terms of medical needs, magnetic particles are used as directed delivery agents for radionuclides as a method of tumor treatment. Also, magnetic particles can be utilized in sensor and separation technology. For example, the surface of the magnetic particles could be functionalized with specific biomolecular recognition sites, cells or proteins to detect antibodies through separation of a fluidic medium using magnetic fields.

It is well known that superparamagnetic particles only exhibit magnetization in the presence of a magnetic field. A superparamagnetic nanostructure having a well-controlled shape, size, and composition would be useful in the biological field, as well as many other fields. Superparamagnetic nanostructures can be easily introduced into a biological fluid without the concerns of agglomeration due to ferromagnetic attraction that would be present in other non-superparamagnetic particles and nanostructures. Additionally, the presence and location of the superparamagnetic nanostructures can be detected using a magnetic field.

Iron silicates particles exhibit superparamagnetic properties below a critical size. Beginning in the early 1980's, the characterization of iron silicates provided useful early information concerning iron species at different calcinations temperatures and a limited study of magnetic properties. In addition, these earlier studies developed a synthesis strategy for producing bulk iron silicates whereby metal alkoxides, specifically iron triethoxide and iron tripropoxide, were mixed with silicon precursors, most commonly iron salts were used such as iron halides ($FeCl_3$) and organic salts like iron nitrate. Moving to the late 1990s, more extensive magnetic measurements were reported on bulk iron silicate composites. Several systems involving silica precursors and iron alkoxides or iron salts produced the phase, $\gamma$-$Fe_2O_3$ (maghemite), which in bulk form is ferromagnetic. The $\gamma$-$Fe_2O_3$ particles found in the silicates were below the critical size for ferromagnetism resulting, however, in superparamagnetic behavior of the composites. Superparamagnetic iron (III) nanoparticles were produced having a narrow size distribution, 4–6 nm, with varying degrees of iron salt content. It was determined that a transition to ferromagnetism occurs at lower temperatures and increased particle size. The transition was clarified to indicate that at low concentrations of $Fe_2O_3$ the change occurs at a particle size of 5 nm. Most studies included the effects of thermal treatments on silica composites to maximize magnetization. Two factors contributed to predicting the magnetic moment of an iron silicate, the concentration of iron to that of silica and the various temperature treatments. In general, research has indicated that maximizing iron content and administering calcinations temperatures in the range of 600–900° C. lead to increasing amounts of maghemite, $\gamma$-$Fe_2O_3$, and yielded high magnetic moments. Heretofore, conventional techniques for making superparamagnetic particles have been limited to the production of spherical particles.

Diamagnetic aluminosilicate mesostructures have been synthesized from block copolymer phases. By increasing the fraction of inorganic precursors, 3-glycidyloxy-propltrimethoxysilane and aluminum-sec-butoxide, expected block copolymer morphologies were exhibiting phase separation on the length scale of about 20 nm. Later studies extended this approach to produce single nano-objects. The hydrophilic part of the block copolymer was embedded in the inorganic phase while the hydrophobic part forms the second phase. Then an organic solvent dissolves the bulk materials leading to "hairy" objects. Upon heating at high temperatures (~600° C.), aluminosilicate spheres, cylinders, and plates of controlled shape, size, and composition result. However, there have been no reports relating to the production of superparamagnetic nanostructured material having these various shapes. In particularly, there have been no reports relating to the production of mesoporous nanostructures exhibiting superparamagnetic. Mesoporous nanostructures would be viable structures in filtration processes and as a catalytic material.

Some success with synthesizing magnetic nano-objects on the basis of block copolymer structure direction has already been reported using a particular tri-block copolymer system. Through chemistry on block copolymer spheres in solution, iron was deposited in the cores of a selected tri-block copolymer while still maintaining the integrity of the spheres. The nanosphere size ranged from 4–16 nm and displayed qualitative magnetic properties. The reported construction and study of magnetic nanorods made from uniform magnetic nanosphere presents other interesting issues. A rod shaped magnetic nano-object introduces the effect of shape anisotropy. Shape anisotropy is present when magnetization is achieved more readily along certain axis. For a rod, the long axis is more easily magnetized than the short axis. The presence of shape anisotropy would lead to more individual nanorod moments being aligned, and thus rendering a larger overall moment. Therefore, superparamagnetic nanostructured materials that are not limited to spherical geometries would be advantageous.

Additionally, the use of amphiphilic block copolymers as structure-directing agents to generate nanostructured material is also known. However, prior attempts at generating nanostructured material do not appear to focus on the magnetisms of the nanostructured material produced. Particularly, the use of amphiphilic block copolymers to produce superparamagnetic nanostructured material has not been explored.

BRIEF SUMMARY OF THE INVENTION

Superparamagnetic nanostructured materials are produced using an amphiphilic block copolymer having the form AB, ABA, or ABC as a structure directing agent. The method is unique in attaining unprecedented structural control over the formation and composition of superparamagnetic nanostructured materials. Whereas conventional techniques are limited to spherical particles, the present approach can be conveniently extended to cylindrical and lamellar shapes. Most importantly, the present approach may be used to produce mesoporous nanostructures exhibiting superparamagnetism. These mesoporous nanostructures are useful as filtration devices and catalytic material.

Superparamagnetic nanostructured materials are formed by preparing a block copolymer solution containing an amphiphilic block copolymer. The block copolymer should have the form AB, ABA, or ABC, such that one of the constituents is a hydrophilic polymer. In one preferred embodiment, the amphiphilic block copolymer solution is formed by dissolving poly(isoprene-block-polyethylene oxide), which may be denoted PI-b-PEO, in a non-aqueous solvent. A silicate precursor solution is then formed, preferably in an aqueous solution. The silicate precursor solution undergoes hydrolysis and condensation to form a sol-gel precursor. In one preferred embodiment, an aluminum-containing compound is mixed with the silicate precursor solution. An iron precursor is added to either the block copolymer solution or the sol-gel precursor. In a preferred embodiment, iron alkoxide is added to the block copolymer solution. The sol-gel precursor is mixed with the block copolymer solution whereby a hybrid inorganic nanostructured material is produced. Solvent is removed from the hybrid inorganic nanostructured material to produce individual nanostructured material which are calcinated to form a superparamagnetic nanostructure material. In a preferred embodiment, the superparamagnetic nanostructured material is superparamagnetic aluminosilicate nanostructured material. Although the resulting superparamagnetic nanostructure material is preferably in the shape of a sphere, cylinder or lamellae, the most preferred shape is a mesoporous material.

BRIEF DESCRIPTION OF DRAWINGS

The features and advantages of the present invention will become apparent from the following detailed description of a preferred embodiment thereof, taken in conjunction with the accompanying drawings, in which.

DETAILED DESCRIPTION OF PREFERRED EMBODIMENTS

Figure 1:
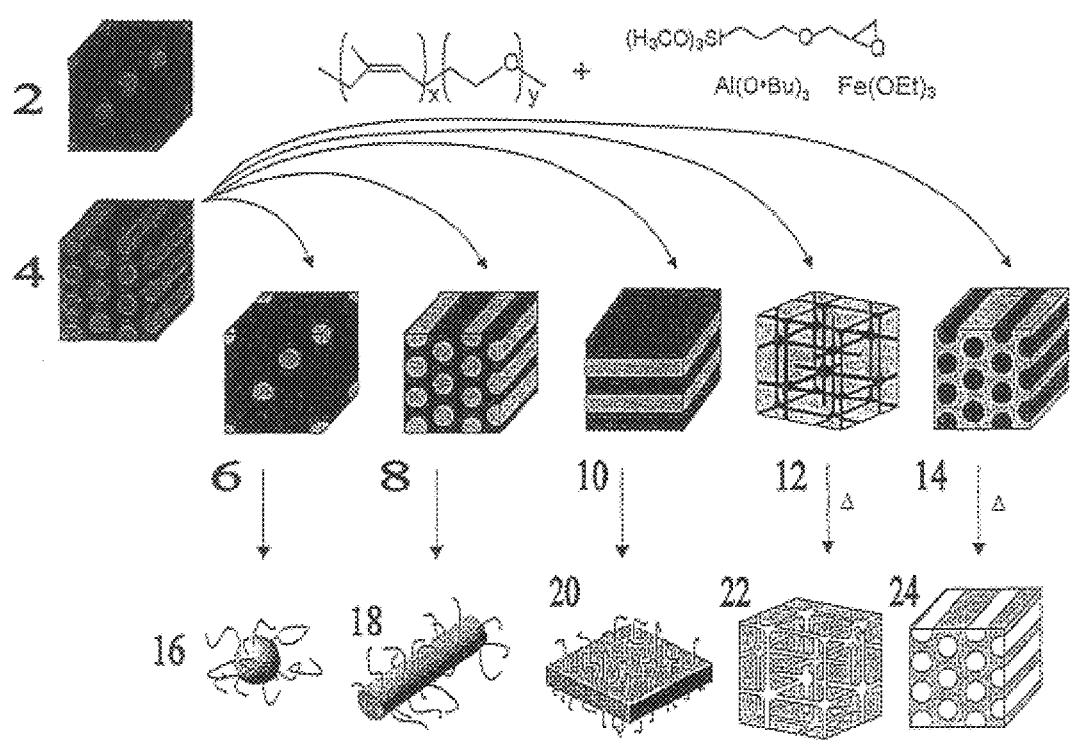
FIG. 1 is a synthesis schematic of the formation of superparamagnetic nanostructured materials.

An amphiphilic block copolymer, having the form AB, ABA, or ABC, is used as a structure-directing agent to produce superparamagnetic nanostructured material. A block copolymer solution containing the amphiphilic block copolymer and a separate silicate sol-gel precursor are formed. An iron precursor is added to either the block copolymer solution or the sol-gel precursor. The block copolymer solution and the sol-gel precursor are mixed forming nanostructured material. The nanostructured material is then calcinated to produce superparamagnetic nanostructured material.

In a preferred embodiment, the structure-directing agent may be selected from a variety of AB, ABA, or ABC amphiphilic block copolymers. Examples of such amphiphilic block copolymers include, but are not limited to, poly(isoprene-block-ethylene oxide) block copolymers (PI-b-PEO), poly(ethylene propylene-b-ethylene oxide) block copolymers (PEP-b-PEO), poly(butadiene-b-ethylene oxide) block copolymers (PB-b-PEO), poly(isoprene-b-ethylene oxide-b-isoprene block copolymers (PI-b-PEO-PI), and poly(isoprene-b-ethylene oxide-methylmethacrylate) block copolymers (PI-b-PEO-b-PMMA). Additionally, preferred amphiphilic block copolymers would include the above-identified block copolymers wherein the PEO is replaced by any suitable hydrophilic polymer.

Generally, the superparamagnetic nanostructured material is produced by selectively swelling the hydrophilic phase of the block copolymer, such as the PEO phase of the preferred embodiment, with a sol-gel precursor, which is molecularly compatible with only the hydrophilic polymer. The amphiphilic block copolymer is preferably dissolved in a non-aqueous solvent to form a block copolymer solution. A sol-gel precursor is formed by first forming a silicate precursor solution containing a silicon-containing compound. The silicon-containing compound is a silicon alkoxide, such as 3-glycidoxy-propyltrimethoxysilane (GLYMO), tetramethoxysilane (TMOS), or tetraethyoxysilane (TEOS). The silicon-containing compound may be mixed with or without an aluminum-containing compound, such as an aluminum alkoxide, most preferably aluminum-tri-sec-butoxide. If an aluminum-containing compound is added to the silicate precursor solution, a preferred ratio of silicon-containing compound and aluminum-containing compound of 90:10 provides for the incorporation of the iron phase later in the process. The preferred ratio results in a higher loading of iron and still maintains a cross-linked ceramic gel after the process is complete. Preferably, the silicate precursor solution is an aqueous solution. The silicate precursor solution undergoes hydrolysis and condensation whereby the sol-gel precursor is formed. In one embodiment, the silicate precursor solution undergoes hydrolysis and condensation for approximately 50 minutes. The sol-gel precursor contains a silicate matrix which hosts the magnetic iron phase. This iron phase is primarily composed of $\gamma$-$Fe_2O_3$, a magnetically active form of iron oxide. A salt may be added to the sol-gel precursor to help shield surface charges for better gelation of the sol within the hydrophilic polymer. The salt may also act as nucleation sites for the iron oxide precipitates that are formed later. Examples of salts that may be added to the sol-gel precursor include, but are not limited to, alkali halides or alkaline metals salts, such as potassium chloride and cesium chloride. In a preferred embodiment, a salt, such as potassium chloride, is added to a sol-gel precursor containing GLYMO and aluminum-tri-sec-butoxide to improve the gelation. An iron precursor is added to either the block copolymer solution or the sol-gel precursor. In a preferred embodiment, wherein the iron precursor is an iron alkoxide, the iron precursor is added to the block copolymer solution. The block copolymer solution and the sol-gel precursor are combined whereby the iron undergoes hydrolysis leading to the formation of a hybrid inorganic nanostructured material. The concentration of the iron is low enough to prevent precipitation of a condensed iron oxide phase. The resulting material has the iron phase molecularly mixed within the nanostructured material. Solvent in the hybrid inorganic nanostructured material is then removed. Preferably, the solvent is removed by dissolving the material in a solvent, such as toluene, selective for non-hydrophilic polymer, poly(isoprene) in the preferred PI-b-PEO block copolymer embodiment, to disperse the bulk material into individual nanostructured material or by casting films to evaporate the solvents.

Calcination of the nanostructured material to 550° C. nucleates γ-Fe$_2$O$_3$ precipitates within the silicate matrix generating a superparamagnetic nanostructured material. Heat treatments to 750° C. yield successful results with stronger magnetic moments. The dimensions of the superparamagnetic nanostructured material can be tailored with a characteristic length scale between 5–100 nm depending on the molecular weight of the amphiphilic block copolymer used and the amount of inorganic sol-gel precursor added within a single morphology.

FIG. 1 shows a synthesis diagram of the formation of the superparamagnetic nanostructured material using an example block copolymer of PI-b-PEO containing an iron precursor. A pure block copolymer in a body-centered cubic (BCC) mesophase 2 or a pure block copolymer in a hexagonal cylinder mesophase 4 may be used in the present invention. FIG. 1 shows the morphology of one preferred block copolymer PI-b-PEO. The pure block copolymers 2, 4 as depicted in FIG. 1 show the PI phase in black and the PEO phase in dark gray. The hexagonal cylinder mesophase 4 is achieved by increasing the polymer block fraction of PEO with respect to PI, generally 17–46 wt % PEO. Both morphologies can be used to generate the different structures described below. As increasing amount of inorganic sol-gel precursor material is added to the parent pure block copolymer similar mesophases seen in a pure block copolymer system can be achieved. However, the "plumber's nightmare" (PN) morphology, a bicontinuous morphology, is only observed when using the hexagonal cylinder mesophase 4. Hence, the following morphologies will be produced using the hexagonal cylinder mesophase 4 block copolymer. A BCC phase 6 is produced by adding an inorganic sol-gel precursor to obtain a volume of PEO+inorganic sol-gel precursor approximately equal to 23 vol %. A hexagonal cylinder phase 8 is produced by adding inorganic sol-gel precursor to obtain 26–35 vol % PEO+inorganic sol-gel precursor. A lamellae phase 10 is produced by adding inorganic sol-gel precursor to obtain 40–55 vol % PEO+ inorganic sol-gel precursor. The "plumber's nightmare" phase 12 occurs when 60–62 vol % of PEO+inorganic sol-gel precursor is achieved. An inverse hexagonal cylinder phase 14 is produced when the PEO+inorganic sol-gel precursor achieves a vol % between 65–75%. As a reference, blocks 6, 8, 10, 12 and 14 show the PI phase in black and a PEO+inorganic phase in light gray. When the phases 6, 8 and 10, are treated with a solvent, e.g. toluene, to dissolve the bulk material and disperse the inorganic nanostructured material individual spheres 16, cylinders 18 and lamellae 20, respectively, are produced. PI chains remain attached to the inorganic nanostructured material because of the PEO block embedded inside. The "plumber's nightmare" phase 12 is calcined to higher temperatures to pyrolze the organic components leading to empty channels in the PN inorganic matrix that was once occupied by PI thereby producing a PN mesoporous material 22. The organic material in the inverse cylinder phase 14 is pyrolyzed at a heat treatment to 550° C. leaving empty channels in the inorganic mesoporous matrix 24. The morphologies where the minority phase is inorganic give rise to individual nanoparticles while the inorganic rich morphologies give rise to mesoporous materials.

Calcination of the inverse cylinder or "plumber's nightmare" morphologies give rise to superparamagnetic mesoporous materials exhibiting dual functionality as a superparamagnetic high surface area material (see FIG. 1). The regular pore structure in combination with the iron oxide centers dispersed within the walls of the material make the superparamagnetic mesoporous material key to filtration technologies, separation of biological molecules with chemically attached magnetic beads, or high surface area catalysts.

Figure 2:
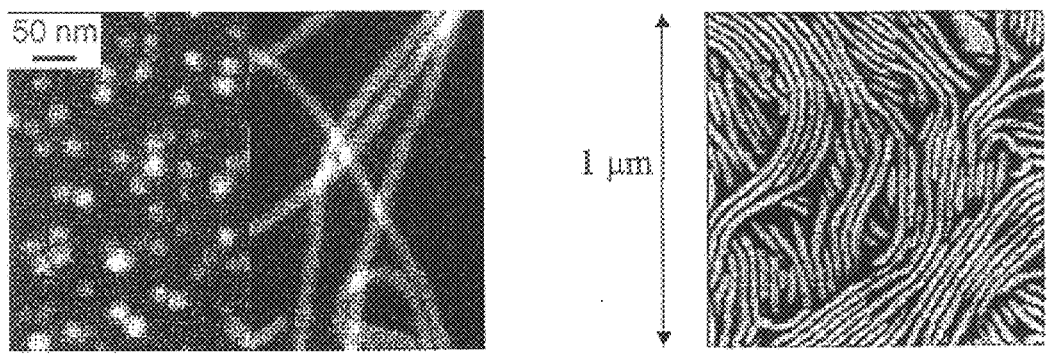
FIG. 2 shows TEM (left) and AFM (right) images of the resulting nanospheres and cylinders.

FIG. 2 shows TEM (left) and AFM (right) images of the resulting nanospheres and cylinders. These images demonstrate that dissolving the bulk copolymer with a solvent is successful in dispersing individual object in a solution. This is necessary for the utility of nanoparticles in the application as described.

EXAMPLE

Poly(isoprene-block-ethylene oxide) block copolymer (PI-b-PEO) is synthesized using conventional anionic polymerization techniques. A block copolymer solution of 5 wt % is prepared in a 50–50 solution of dry tetrahydrofuran (THF) and chloroform. Iron ethoxide is dissolved in the block copolymer solution to obtain a final mole fraction of 25% with respect to the silicon and aluminum alkoxide compounds added later in the process. A separate silicate precursor solution is formed by mixing 3-glycidoxypropyltrimethoxysilane (GLYMO) and aluminum tri-sec-butoxide,whereby the silicate precursor solution undergo a two step hydrolysis and condensation reaction using an acid catalyst. Hydrolysis and subsequent condensation of the silicate precursor solution leads to the formation of a sol-gel precursor having an organically modified aluminosilicate phase. The aluminum acts as a network hardener of the organic-inorganic matrix and as a Lewis acid in opening up the epoxy ring on the silicon hybrid precursor, which also aids in maintaining network integrity. The sol-gel precursor solution is added to the iron-block copolymer solution and subsequent films are cast by evaporation of the solvents. Through a self-assembly process, the amphiphilic block copolymer structures the inorganic materials into well-defined morphologies depending on the volume fraction between the poly(isoprene) polymer phase and the poly(ethylene oxide)-inorganic phase. The PEO is completely intermixed with the inorganic at a molecular level to generate a single homogenous phase of inorganic-organic material; thus, only a two-phase system is observed. Unprecedented structural control is exhibited and a large number of microstructures across the phase diagrams of block copolymers can be formed.

Although the present invention has been disclosed in terms of a preferred embodiment, it will be understood that numerous additional modifications and variations could be made thereto without departing from the scope of the invention as defined by the following claims:

What is claimed is:

1. A method for producing superparamagnetic nanostructures comprising,
   a) preparing a block copolymer solution containing an amphiphilic block copolymer;
   b) preparing a sol-gel precursor containing a silicon-containing compound;
   c) adding an iron precursor to said amphiphilic block copolymer solution or to said sol-gel precursor;
   d) mixing said block copolymer solution and said sol-gel precursor to form a hybrid inorganic nanostructured material;
   e) removing a solvent from said hybrid inorganic nanostructured material to form a individual nanostructured material; and
   f) calcinating said individual nanostructured material to form a superparamagnetic nanostructure material.

2. The method of claim 1, where said amphiphilic block copolymer is selected from the group comprising poly(isoprene-block-ethylene oxide) block copolymer, poly(ethylene propylene-b-ethylene oxide) block copolymer, poly(butadiene-b-ethylene oxide) block copolymer, poly(isoprene-b-ethylene oxide-b-isoprene block copolymer, and poly(isoprene-bethylene oxide-b-methylmethacrylate) block copolymers.

3. The method of claim 2, wherein said amphiphilic block copolymer is a poly(isoprene-block-polyethylene oxide) block copolymer, said poly(isoprene-block-polyethylene oxide) block copolymer has a polyisoprene phase and a polyethylene oxide phase.

4. The method of claim 3, wherein said hybrid inorganic nanostructured material contains said polyethylene oxide phase and said sol-gel precursor at a combined volume of 23 vol %.

5. The method of claim 4, wherein said individual nanostructured material has a spherical shape.

6. The method of claim 3, wherein said hybrid inorganic nanostructured material contains said polyethylene oxide phase and said sol-gel precursor at a combined volume of 26–35 vol %.

7. The method of claim 6, wherein said individual nanostructured material has a cylindrical shape.

8. The method of claim 3, wherein said hybrid inorganic nanostructured material contains said polyethylene oxide phase and said sol-gel precursor at a combined volume of 40–55 vol %.

9. The method of claim 8, wherein said individual nanostructured material has a lamellae shape.

10. The method of claim 3, wherein said hybrid inorganic nanostructured material contains said polyethylene oxide phase and said sol-gel precursor at a combined volume of 60–62 vol %.

11. The method of claim 10, wherein said individual nanostructured material is a mesoporous material.

12. The method of claim 3, wherein said hybrid inorganic nanostructured material contains said polyethylene oxide phase and said sol-gel precursor at a combined volume of 65–75 vol %.

13. The method of claim 12, wherein said individual nanostructured material is a mesoporous material.

14. The method of claim 1, wherein said step of calcinating occurs at a temperature of at least 550° C.

15. The method of claim 1, wherein said step of removing said solvent includes evaporating said solvent by casting films of said hybrid inorganic nanostructured material.

16. The method of claim 1, wherein said step of removing said solvent includes adding toluene to said hybrid inorganic nanostructured material.

17. The method of claim 1, wherein said iron precursor is added to said block copolymer solution.

18. The method of claim 17, wherein said iron precursor is an iron alkoxide.

19. The method of claim 18, wherein said iron alkoxide is iron ethoxide.

20. The method of claim 1, wherein said iron precursor is an iron salt.

21. The method of claim 1, wherein said step of preparing a sol-gel precursor further contains an aluminum-containing compound.

22. The method of claim 21, wherein said aluminum-containing compound is an aluminum alkoxide compound.

23. The method of claim 22, wherein said aluminum alkoxide compound is aluminum-tri-sec-butoxide.

24. The method of claim 23, wherein said silicon-containing compound is 3-glycidoxy-propyltrimethoxysilane.

25. The method of claim 24, further comprising adding a salt to said sol-gel precursor.

26. The method of claim 25, wherein said salt is potassium chloride.

27. The method of claim 1, wherein said silicon-containing compound is 3-glycidoxy-propyltrimethoxysilane.

28. The method of claim 1, wherein said silicon-containing compound is a silicon alkoxide.

29. The method of claim 28, wherein said silicon alkoxide is tetramethoxysilane or tetraethoxysilane.

30. The method of claim 1, wherein said superparamagnetic nanostructure material is a superparamagnetic mesoporous material.

31. The method of claim 1, wherein said step of preparing a block copolymer solution includes dissolving said amphiphilic block copolymer in a non-aqueous solvent.

32. The method of claim 31, wherein said non-aqueous solvent is a solution containing dry tetrahydrofuran and chloroform.

33. The method of claim 21, wherein said silicon-containing compound and said aluminum-containing compound are present in a ratio of 90:10.

34. The method of claim 1, wherein said step of preparing said sol-gel precursor includes mixing said silicon-containing compound in an aqueous solution.

35. The method of claim 1, further comprising adding a salt to said sol-gel precursor.

36. The method of claim 35, wherein said salt is an alkali halide salt or an alkaline metal salt.

37. The method of claim 36, wherein said salt is cesium chloride or potassium chloride.

38. A superparamagnetic nanostructure material comprising, a silicate nanostructured material having superparamagnetism.

39. The superparamagnetic nanostructure material of claim 38, wherein said silicate nanostructured material is a mesoporous material.

40. The superparamagnetic nanostructured material of claim 38, wherein said silicate nanostructured material is in the shape of a sphere, cylinder or lamellae.

41. The superparamagnetic nanostructured material of claim 38, wherein said silicate nanostructured material is an aluminosilicate nanostructured material.

42. The superparamagnetic nanostructured material of claim 41, wherein said aluminosilicate nanostructured material is a mesoporous material.

43. The superparamagnetic nanostructured material of claim 41, wherein said aluminosilicate nanostructured material is in the shape of a sphere, cylinder or lamellae.

* * * * *